Nov. 18, 1952  H. J. BARNHARD  2,618,563
FOOD CONTAINER
Filed Jan. 18, 1951

INVENTOR.
Harold J. Barnhard
BY
ATTORNEY

Patented Nov. 18, 1952

2,618,563

UNITED STATES PATENT OFFICE 2,618,563

FOOD CONTAINER

Harold J. Barnhard, New York, N. Y., assignor to Packease-Servease Corp., New York, N. Y., a corporation of New York Application January 18, 1951, Serial No. 206,547

6 Claims. (Cl. 99—186)

This invention relates to packing olives or other articles of food within a glass jar or similar container.

This application is a continuation-in-part of my prior co-pending, but now abandoned, application, Ser. No. 176,645 filed July 29, 1950 and entitled "Food Container and Method and Apparatus for Packing Same." The container of the present application is substantially similar to that of said prior co-pending application except for an improvement which comprises the addition of a resilient means at the top of the tree-like food supporting member and adapted to resiliently abut against the lower surface of the container cap. This resilient means enables the tree-like food supporting member to be held securely engaged or clamped between the bottom of the container and the cap, notwithstanding slight variations in the height of the supporting member or the distance between the cap of the container and its bottom. The secured assembled relation of the food supporting member within the glass jar or other container thus provided by the resilient means prevents the supporting member from being jostled or moved about within the interior of the container during handling and transportation of the latter, and thereby prevents bruising or other disadvantageous damage effects to the olives or other food products which are held on the supporting member. Furthermore, the resilient means for engaging the under-surface of the jar cap or other container cover obviates the necessity for manufacturing the supporting member and the jar with close tolerances, since any deviation in the height of the supporting member or the distance between the jar cap and jar bottom will be rendered insignificant by the "take-up" effect of the resilient means.

Although the drawing and specification discloses the invention as specifically applied to the packing of olives within a glass jar, this is merely by way of example of one of the many applications to which the invention may be put, it being understood that articles of food other than olives and other types of containers may be utilized without departing from the invention. Furthermore, it is intended that the terms "olives" and "glass jar" as used throughout the specification and claims be understood to include all other equivalent types of food and containers, respectively.

To illustrate the advantages and importance of the invention to the food packing industry, for the sake of convenience and brevity the invention will be exemplified and illustrated in a specific application to the art of packing olives. Heretofore the packing of olives within glass jars has involved considerable expense, inefficiency and difficulty. The olives are placed by hand within narrow jars in a tightly packed arrangement since it is imperative that they be restrained against free juggling movement which would tend to injure them as the jars are shipped or moved about. When the jar is being packed, great precision and skill are required so that the olives will be uniformly arranged within the jar in such a manner that the uppermost olives abut against the upper arcuate surface of the jar leading into the narrow neck thereof so as to maintain all of the olives in a tightly packed arrangement.

It requires great skill and much time and effort on the part of highly-paid labor to meticulously arrange the olives within each individual jar in such a manner that an efficient utilization of space within the jar is utilized while at the same time the olives are neither too tightly packed so as to be crushed nor too loosely packed so as to be bruised in shipment. This hand method of packing, in addition to being slow and costly, presents the further disadvantage in that after the olives have been fingered and packed by human hands, it is necessary to wash them thoroughly. The washing operation is particularly difficult in view of the fact that the olives are tightly compressed within the long narrow jar. The washing operation cannot entirely clean the olives due to the inaccessibility of the washing fluid to the tightly-pressed abutting surfaces of the olives.

Another difficulty in the prior art of hand-packing olives is the fact that the brine solution in which the olives are submerged must entirely fill the jar to the very top. This has been necessary in order to maintain the olives submerged within the brine when the jars are inverted and during shipment. The necessity of filling the jars with brine solution to the very top causes much difficulty in pouring the solution and handling the filled jars and inevitably results in much waste of brine solution.

In addition to the above-noted disadvantages and difficulties in the packing operation as carried out heretofore, the packed jar resulting presents many undesirable characteristics. Since the olives are tightly packed within a long narrow jar they may be removed therefrom only with considerable prodding, maneuvering and annoyance. The brine solution extends to the top of the jar and usually spills when the cap is first removed. Furthermore, the appearance of the olives crushed flat against the walls of the jar is not attractive from the standpoint of marketability.

The above noted objectionable features of the prior art of packing olives or other food products are eliminated by the present invention which involves a novel container structure in which the olives are packed, the invention of this present application residing more particularly in the container combination disclosed and claimed in my said prior co-pending application Serial No. 176,645, together with a resilient means on the top of the supporting member and adapted to engage the under-surface of the container cap.

Briefly described, the container structure comprises a rigid longitudinal supporting member having a plurality of spearing or impaling elements projecting radially outwardly therefrom. The olives are either manually impaled on these spearing elements or else placed thereon by means of suitable automatic apparatus. After the longitudinal member is thus loaded with olives, it is put through a sprayer or other suitable washing means. The empty jars are then filled with a predetermined amount of brine solution and the olive-loaded supporting members are placed within the jars. The supporting member extends longitudinally of the jar and has a lower end resting upon the jar bottom and an upper end abutting against the undersurface of the jar cap. The cap and the bottom of the jar press against the respective abutting ends of the member so as to hold the latter in its fixed axial position within the jar. The impaled olives are spaced somewhat from the top of the jar and the top surface of the brine solution is at a height above the uppermost olives, but below the cap and the top of the jar. This enables the olives to be completely submerged without necessitating a complete filling of the jar with brine solution. The lowermost olives are similarly spaced above the bottom portion of the jar so that when the jar is inverted all of the olives will remain immersed in the brine solution.

When the packed olives are to be removed for use, the supporting member on which they are impaled or otherwise supported may be lifted bodily from the jar and the olives quickly and easily removed from the impaling elements without the usual digging and manoeuvering usually necessary with the conventional tightly-packed olive jar. It will be noted that during the packing operation the olives may be sprayed or washed before being inserted into the jar since the insertion operation is accomplished by manipulating the rod on which the olives are impaled so as to obviate the necessity for human contact with the olives themselves.

Figure 2:
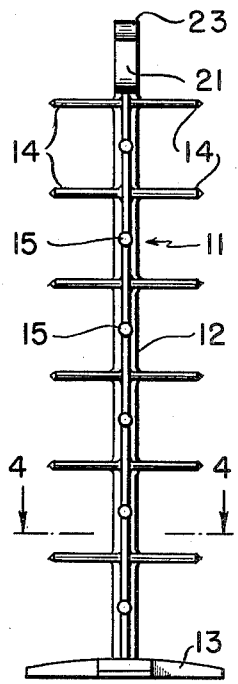
Fig. 2 is a side elevational view of the tree-like supporting member.
Figure 3:
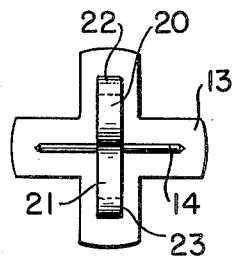
Fig. 3 is a top elevational view of the supporting member.
Figure 4:
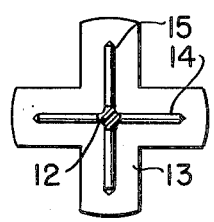
Figure 5:
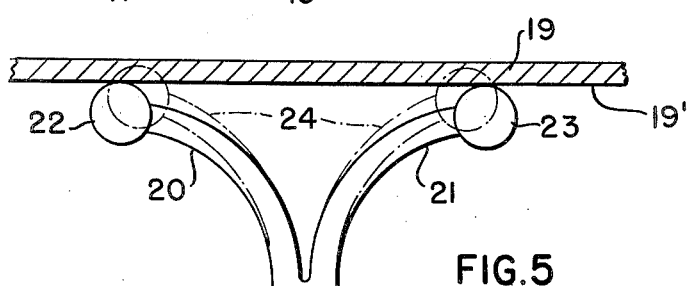

Fig. 4 is a horizontal transverse sectional view of the supporting member taken on the line 4—4 of Fig. 2; and Fig. 5 is an enlarged fragmentary side elevational view of the upper end of the supporting member and showing in detail the resilient means engaging the under-surface of the jar cap, the dash-dot lines indicating the normal position of the resilient means before they are deflected downwardly by the pressure exerted by the jar cap.

Referring first to Fig. 2 of the drawing, the reference numeral 11 indicates generally the supporting member which comprises a vertical longitudinal rod 12. The lower end of the rod 12 is provided with a plurality of horizontal radially-extending legs 13 which are adapted to rest upon the bottom of the container so as to support the rod 12 in a vertical position therein.

Throughout the intermediate portion of the rod 12 are a plurality of impaling elements, a first series 14 of such elements extending in a vertical plane parallel to the plane of the drawing as shown in Fig. 2, and a second series of impaling elements 15 lying in a vertical plane which is perpendicular to the plane of said first series of elements 14. It will be noted that the impaling elements 15 are offset a vertical distance with respect to the impaling elements 14; that is, the elements 15 are located intermediate the elements 14 so as to enable the olives to be packed in staggered relation as shown in Fig. 1, thereby providing for a maximum utilization of the volume of the jar.

Figure 1:
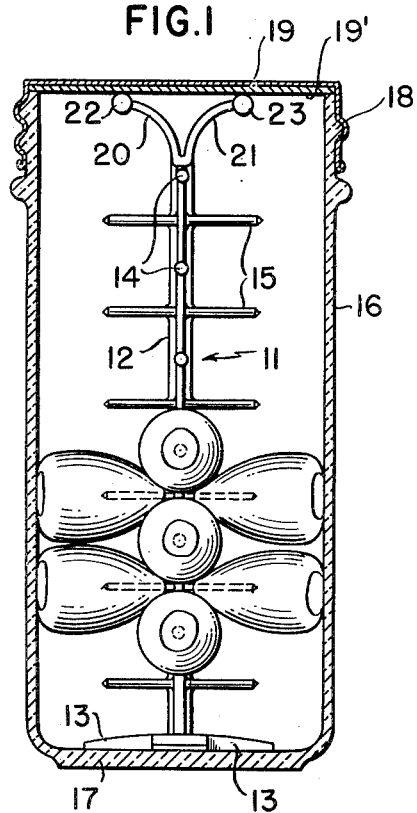
Fig. 1 is a vertical sectional view showing the tree-like supporting member mounted axially within an olive jar and having several olives mounted on the impaling elements of the supporting member, the upper end of the supporting member having a resilient means yieldably engaging the under-surface of the jar cap.

Referring now to Fig. 1 the jar or container 16 is of conventional construction and is provided with a bottom 17 at its lower end, and conventional cap-engaging ribs or projections 18 at its upper end, the latter being adapted to hold the cap 19 securely in place on the jar 16.

It will thus be seen that the vertical rod 12, legs 13, and impaling elements 14, 15 form a tree-like supporting member upon which olives or other food items may be impaled, the olive-loaded tree-like member being adapted to be placed within an olive jar or other container as shown in Figure 1. As heretofore described the food container of the present invention is substantially similar to that of said prior application Serial No. 176,645.

The resilient means which comprises the present invention is best seen in Fig. 5 wherein the reference numerals 20, 21 designate two arcuate resilient members which are secured to the upper end of the rod 12 and diverge upwardly and outwardly therefrom. The upper outer ends of the resilient members 20, 21 are provided with cylindrical bearing members 22, 23, respectively, so as to provide rounded bearing surfaces adapted to slidably engage the under-surface 19' of the jar cap 19. The dash-dot lines 24 indicate the normal position of the resilient members 20, 21 before they are urged downwardly by the pressure of the cap 19 on the bearing members 22, 23.

It will be understood that the particular construction of the tree-like supporting member 11 and the resilient members 20, 21 disclosed in the drawing and described in this specification is intended to be merely illustrative of one embodiment which the invention may take in practice, many modifications of this embodiment being readily apparent to those skilled in the art. For instance, the resilient means may be in the form of a coil spring instead of the members 20, 21. Also, articles of food, other than olives may be utilized. Furthermore, means other than impaling elements for mounting the olives on the supporting member may be employed. Although these particular disclosed features involve invention and are more advantgeous than other arrangements which may be employed, it is intended that the disclosure in the specification and drawing be merely an exemplification, rather than as limiting the scope of the invention which is delineated in the appended claims.

Having described my invention what I claim and desire to secure by Letters Patent is as follows:

1. A device for containing uniformly-packed food articles comprising a container having a base portion at its lower end and a cover on its upper end, a longitudinal member within the jar and extending axially thereof, said member having a lower end resting on said base portion and a yieldable upper end abutting against said cover, and being compressed by the cover and the base portion so as to be held firmly in its axial position, a plurality of elements each rigidly secured at one inner end to said member and projecting radially outwardly therefrom, and means on the outer ends of said elements for impaling articles of food.

2. The combination comprising a glass jar having a cap and a food supporting means therein, said supporting means comprising a column-like member extending through the axis of the jar, a plurality of elements each rigidly secured at one inner end to said member and projecting radially-outwardly therefrom, impaling means on the outer ends of said elements for piercing and holding articles of food, and a pair of resilient members secured at one end to the upper portion of said column-like member and diverging upwardly and outwardly therefrom being compressed with the under-surface of said cap.

3. A device for containing uniformly-packed food articles comprising a container having a base portion at its lower end and a cover on its upper end, a longitudinal member within the jar and extending axially thereof, said member having a lower end resting on said base portion and a yieldable upper end abutting against said cover and being compressed by the cover and the base portion so as to be held firmly in its axial position, a plurality of elements each rigidly secured at one inner end to said member and projecting radially outwardly therefrom, and impaling means on the outer ends of said elements for piercing and holding articles of food.

4. A device for containing uniformly-packed food articles comprising a container having a base portion at its lower end and a cover on its upper end, a longitudinal member within the jar and extending axially thereof, said member having a lower end resting on said base portion and a resilient upper end abutting against said cover and being compressed by the cover and the base portion so as to be held firmly in its axial position, a plurality of elements each rigidly secured at one inner end to said member and projecting radially outwardly therefrom, said elements being located along the length of said member from an upper point spaced substantially beneath said cover to a lower point spaced substantially above said base portion, a liquid preservative within the container and filling the latter to a height above said upper point and substantially beneath said cover whereby the elements will be entirely immersed in the liquid preservative, and means on the outer ends of said elements for securely holding articles of food.

5. A device for containing uniformly-packed food articles comprising a glass jar having a base portion at its lower end and a cover on its upper end, a longitudinal member within the jar and extending axially thereof, said member having a lower end resting on said base portion and a resilient upper end abutting against said cover and being compressed by the cover and the base portion so as to be held firmly in its axial position, a plurality of elements each rigidly secured at one inner end to said member and projecting radially outwardly therefrom, said elements being located along the length of said member from an upper point spaced substantially beneath said cover to a lower point spaced substantially above said base portion, a liquid preservative within the glass jar and filling the latter to a height above said upper point and substantially beneath said cover whereby the elements will be entirely immersed in the liquid preservative, and impaling means on the outer ends of said elements for piercing and holding articles of food.

6. The combination set forth in claim 5 wherein the uppermost of said elements at said upper point of the member is spaced from said cover a distance approximately equal to the distance between the lowermost of said elements and the base portion of the jar, whereby when the jar is inverted all of the elements will remain submerged within the liquid preservative although the jar is not completely filled by the liquid preservative.

HAROLD J. BARNHARD.

REFERENCES CITED

The following references are of record in the file of this patent:

UNITED STATES PATENTS

| Number | Name | Date |
|---|---|---|
| 854,820 | Goodwin | May 28, 1907 |